United States Patent
Li et al.

(10) Patent No.: US 9,844,833 B2
(45) Date of Patent: Dec. 19, 2017

(54) SYSTEM AND METHOD FOR LASER CUTTING SAPPHIRE USING MULTIPLE GAS MEDIA

(71) Applicant: Apple Inc., Cupertino, CA (US)

(72) Inventors: Michael M. Li, San Jose, CA (US); Anthony J. Richter, San Jose, CA (US); Dale N. Memering, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 447 days.

(21) Appl. No.: 14/168,285

(22) Filed: Jan. 30, 2014

(65) Prior Publication Data

US 2015/0209903 A1    Jul. 30, 2015

(51) Int. Cl.
| | |
|---|---|
| *B23K 26/00* | (2014.01) |
| *B23K 26/12* | (2014.01) |
| *B23K 26/38* | (2014.01) |
| *B23K 26/142* | (2014.01) |
| *B23K 26/402* | (2014.01) |
| *B23K 103/16* | (2006.01) |
| *B23K 103/00* | (2006.01) |

(52) U.S. Cl.
CPC .......... *B23K 26/125* (2013.01); *B23K 26/142* (2015.10); *B23K 26/38* (2013.01); *B23K 26/402* (2013.01); *B23K 2203/172* (2015.10); *B23K 2203/50* (2015.10)

(58) Field of Classification Search
CPC .......... B23K 2203/172; B23K 2203/50; B23K 26/125; B23K 26/142; B23K 26/38; B23K 26/402

USPC .......................................... 219/121.6–121.86
See application file for complete search history.

(56) References Cited

U.S. PATENT DOCUMENTS

| | | | |
|---|---|---|---|
| 3,453,097 A | 7/1969 | Hafner | |
| 3,885,943 A | 5/1975 | Chui | |
| 4,467,168 A | 8/1984 | Morgan | |
| 4,682,003 A | 7/1987 | Minakawa | |
| 6,198,070 B1 * | 3/2001 | Nakayama | B23K 26/1476 219/121.68 |
| 6,376,797 B1 | 4/2002 | Piwczyk et al. | |
| 6,562,698 B2 | 5/2003 | Manor | |
| 6,580,054 B1 * | 6/2003 | Liu | B23K 26/03 219/121.68 |
| 6,899,798 B2 | 5/2005 | Weldon et al. | |
| 7,512,297 B2 | 3/2009 | Farah | |
| 7,514,291 B2 | 4/2009 | Akram | |
| 7,741,579 B2 * | 6/2010 | Lambert | B23K 26/142 219/121.6 |
| 7,803,451 B2 | 9/2010 | Lee et al. | |

(Continued)

OTHER PUBLICATIONS

U.S. Appl. No. 13/623,595, filed Sep. 20, 2012, Richter et al.

*Primary Examiner* — Sang Y Paik
(74) *Attorney, Agent, or Firm* — Brownstein Hyatt Farber Schreck, LLP (57) ABSTRACT

A system and a method for manufacturing a sapphire part. A sapphire substrate is obtained for performing a laser cutting operation. The sapphire substrate is cut along a cut profile using a laser and a first gas medium. The first gas medium is substantially comprised of an inert gas. The sapphire substrate is then irradiated at or near the cut profile using the laser and a second gas medium. The second gas medium is different than the first gas medium comprising oxygen.

22 Claims, 7 Drawing Sheets

(56) References Cited

U.S. PATENT DOCUMENTS

| | | | | |
|---|---|---|---|---|
| 7,966,785 B2* | 6/2011 | Zadesky | ........... | B32B 17/10018 239/362 |
| 2004/0102229 A1* | 5/2004 | Hutchison | .............. | H01H 13/70 455/575.1 |
| 2007/0284785 A1* | 12/2007 | Hoekstra | ................ | B23K 26/03 264/400 |

* cited by examiner

SYSTEM AND METHOD FOR LASER CUTTING SAPPHIRE USING MULTIPLE GAS MEDIA

TECHNICAL FIELD

The subject matter of this disclosure relates generally to manufacturing a sapphire part, and in particular to using a laser and more than one gas medium to cut a sapphire substrate and to produce a sapphire part. The sapphire part may be used as a protective cover for a portable electronic device.

BACKGROUND

Corundum is a crystalline form of aluminum oxide and is found in various different colors, most of which are generally referred to as sapphire. Sapphire is a hard and strong material with a hardness of 9.0 on the Mohs scale, and, as such, is capable of scratching nearly all other minerals. Because of its hardness and strength, sapphire may be an attractive alternative to other translucent materials like glass or polycarbonate. However, due to its brittle nature, sapphire is susceptible to dramatic strength reductions as a result of small defects in the surface or edge of the part. It is generally desirable to minimize small defects that may occur during manufacturing to produce a sapphire part that is durable and long lasting.

Manufacturing a near defect-free sapphire part may present unique challenges. The strength of a brittle material, such as sapphire, is limited due to flaw population on the surface or edges of the part. An inconsistent or inadequate surface or edge finish can lead to the propagation of micro cracks and result in a weakened part. Traditional translucent materials like silicate glass are able to be chemically strengthened to a significant depth to minimize the effect of these flaws, but on extremely hard materials such as sapphire, a similar process is not readily available. Additionally, sapphire's hardness makes cutting and polishing the material both difficult and time consuming when conventional processing techniques are implemented. Further, conventional processing tools, such as cutters, experience relatively rapid wear when used on sapphire. This further increases the resource demand when surface finishing sapphire parts.

In general, there is a need for a system and method for producing sapphire parts having minimal micro-defects on the edges and surface of the part resulting in improved strength and to reliability over time. There is also a need for a system and method for producing high-quality edge cuts on sapphire parts in a rapid, repeatable fashion while using an efficient amount of resources.

SUMMARY

One example embodiment is directed to a method of manufacturing a sapphire part. A sapphire substrate is obtained for performing a laser cutting operation. The sapphire substrate is cut along a cut profile using a laser and a first gas medium. The first gas medium is substantially comprised of an inert gas. The sapphire substrate is then irradiated at or near the cut profile using the laser and a second gas medium. The second gas medium is different than the first gas medium and comprises at least 15% oxygen by volume. The sapphire part is eventually separated from the sapphire substrate. In some embodiments, the inert gas is nitrogen gas. In some cases, the first gas medium comprises at least 99% inert gas by volume.

In some embodiments, a final cut is performed on the sapphire substrate using the laser. The final cut may result in the separation of the sapphire part from the sapphire substrate or, alternatively the final cut may remove additional material from the sapphire part. In some cases, the final cut is performed after the sapphire substrate has been irradiated using the second gas medium. In other cases, the final cut is performed before the sapphire substrate has been irradiated using the second gas medium.

In some embodiments, the irradiating using the second gas medium is performed at an irradiation laser power that is less than a cutting laser power used for cutting the sapphire substrate using the first gas medium. In some cases, the cutting laser power is less than 950 watts and the irradiating laser power is at least 500 watts less than the cutting laser power.

In some embodiments, the final cut is performed using a final-cut laser power that is greater than a cutting laser power used for cutting the sapphire substrate using the first gas medium.

In one example embodiment, cutting the sapphire substrate along the cut profile includes (1) melting a portion of the sapphire substrate along the cut profile using the laser and (2) removing the portion of the sapphire substrate along the cut profile by blowing a stream of the first gas medium on the portion of the sapphire substrate that has been melted.

In one example embodiment, irradiating the sapphire substrate along the cut profile includes (1) heating a portion of the sapphire substrate along the cut profile using the laser, and (2) immersing the portion of the sapphire substrate being heated in the second gas medium.

In some embodiments, the sapphire part may be installed as a protective cover on a portable electronic device. In some cases, the portable electronic device is any one of: a mobile telephone, a portable media player, a wearable device, or a tablet computing device.

One example embodiment is directed to a system for producing a sapphire part. The system includes a gas delivery device that is configured to provide a stream of gas to a portion of a sapphire substrate that is irradiated by a laser beam. The system also includes a laser configured to produce the laser beam incident on the portion of the sapphire substrate. In some cases, the laser is further configured to irradiate the sapphire substrate along a cut profile while a first gas medium is provided by the gas delivery device. The first gas medium is substantially comprised of an inert gas. The laser is further configured to irradiate the sapphire substrate along the cut profile while a second gas medium is provided by the gas delivery device. The second gas medium is different than the first gas medium and comprises at least 15% oxygen by volume. In some embodiments, the laser is an infrared laser having a maximum power of 1,500 watts and a variable pulse duration ranging from 0.2 ms to 10 ms.

DETAILED DESCRIPTION

Numerous consumer and non-consumer devices utilize protective coverings, windows, and/or surfaces formed from hard materials like sapphire. Compared to other optically clear materials such as silicate glass, sapphire offers improved scratch resistance and strength. However as previously mentioned, sapphire is also relatively brittle and may fail if minor defects are introduced during the manufacturing process. Also, because of the high strength and hardness of the material, cutting and polishing processes should be optimized to reduce cost and difficulty in manufacturing. As discussed herein, in accordance with various embodiments, sapphire parts can be manufactured using a laser cutting process that uses more than one gas medium to help remove material and also control discoloring that may occur during the cutting process.

In particular, a fusion laser cutting process can be used to produce a sapphire part having acceptable edge and surface finish. During a fusion cut, a laser beam is used to heat and partially melt a portion of the sapphire material. A directed stream of gas is then used to remove the melted material leaving a void or depression in the sapphire material. The efficiency and edge finish produced by a fusion cut may be superior to other types of laser cutting techniques, including, for example, ablation laser cutting techniques or laser scribing.

The type of gas medium that is used in a laser fusion cut may affect the quality of the edge and may also help control chemical reactions, such as oxidation, with the sapphire material. For example, the use of an inert gas (e.g., nitrogen) during a fusion laser cut may result in an edge finish having few micro cracks, chips, or other physical discontinuities. However, the use of an inert gas may also produce a brown or dark tint near the edge of the part, which may be undesirable for visual or optical clarity reasons. Other gasses, such as oxygen, can be used during a fusion laser cutting process to increase oxidation and increase the amount of heat that is generated, which may result in an increased cutting speed. Additionally, the use of oxygen gas may remove the brown or dark tint produced by a previous laser cut performed using nitrogen gas. However, due to increased levels of heat that may be produced, using oxygen gas may also increase the risk of micro cracks, chips, or other physical discontinuities at the edge of the part. The techniques described herein can be used to utilize the advantages of different types of gas media, while minimizing potential disadvantages. In accordance with various embodiments described below, a sapphire part manufacturing process may use a laser and more than one gas medium to produce a sapphire part having an acceptable edge finish and visual appearance.

1. Device with Sapphire Protective Cover Sheet

Figure 1A:
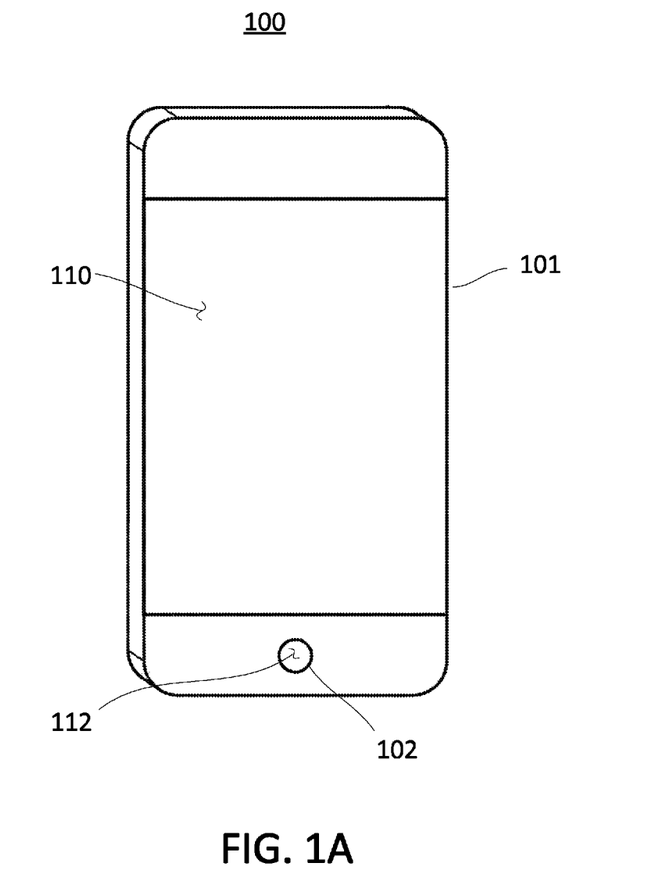
FIG. 1A depicts the front of a sample electronic device.
Figure 1B:
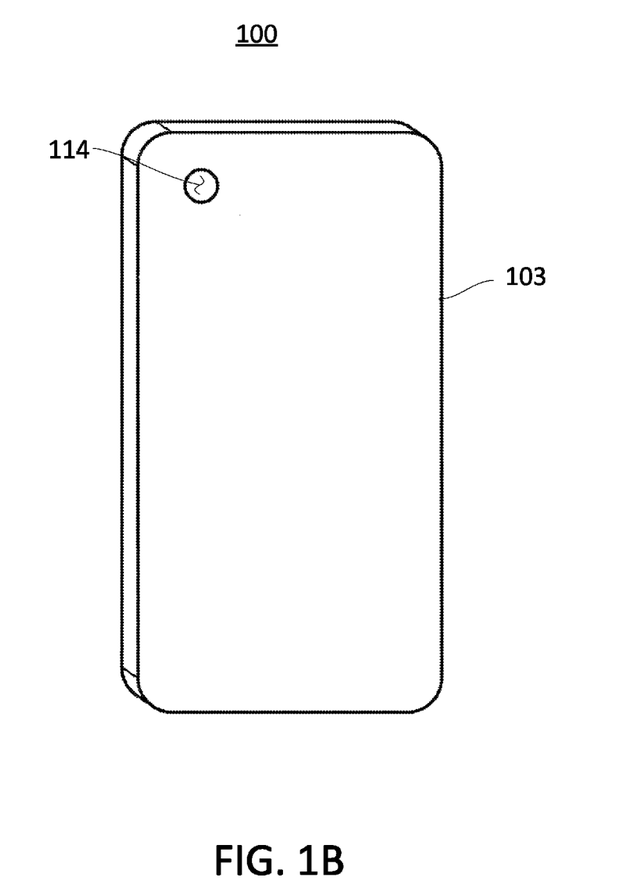
FIG. 1B depicts the back of a sample electronic device.

In accordance with various embodiments, FIGS. 1A-B depict a device having multiple hard protective sheets on the exterior of the device. In the present example, the protective sheets are formed from one or more sapphire parts, which provide outstanding scratch resistance and enhance the mechanical integrity of the device. A protective sheet may also function as an optically transmissive window and provide visibility to underlying components, such as display screens or graphical elements. In a typical implementation, both the optical and mechanical properties of the protective sheets may be important to perception of quality and performance of the device.

As shown in FIG. 1A, the device 100 includes protective cover sheet 101 formed from a sapphire part and used as an optically transmissive protective layer. The cover sheet 101 is typically attached to the device 100 using an optically transmissive adhesive or other bonding technique. In this example, the cover sheet 101 is attached using a pressure sensitive adhesive (PSA) film. The cover sheet 101 may be attached to the face of the display screen 110 and protect the display screen 110 from scratches or other physical damage. The display screen 110 may include a liquid crystal display (LCD), organic LED display, or similar display element. Because the cover sheet 101 overlays the display screen 110, optical clarity and physical strength are important aspects of the cover sheet's 101 functionality. The cover sheet 101 may also be attached to, or be integrated with, a transparent electronic sensor that overlays the display screen 110. In some cases, the electronic sensor covers the entire display screen 110 and is used as the main input device for the user. In some implementations, the cover sheet 101 may be integrated with a capacitive touch sensor used to detect finger or stylus touches on the surface of the cover sheet 101.

The cover sheet 101, depicted in FIG. 1A, is formed from a sapphire part having an overall thickness of less than 3 mm. Typically, the overall thickness of the cover glass 101 is approximately 1 mm, although this thickness may vary between devices and/or embodiments. The cover glass 101 may be formed from a single sheet of sapphire material or, alternatively, be formed from a laminate material made from multiple layers and having at least one layer formed from a sheet of sapphire. In the present example, one side of the cover sheet 101 is printed with a solid, opaque border around a perimeter portion. The center portion of the cover sheet 101 remains optically transmissive. The printed side of the cover sheet 101 is typically the side that is opposite the external face of the device 100 to prevent the printed portion from becoming scratched or damaged. The side of the cover sheet 101 that is external to the device may include an anti-reflective or other type of coating to enhance the optical properties of the cover glass 101.

As shown in FIG. 1A, the front surface of the device 100 also includes a button sheet 102 used to protect the surface of the control button 112. In this example, the button sheet 102 is formed from a sapphire part and is used as an optically transmissive protective layer. The button sheet 102 protects the surface of a control button 112 and allows visibility of any graphical elements that are printed on the control button 112. In some cases, it is not necessary that the button sheet be optically transmissive. For example, the button sheet 102 may be opaque and itself printed with a graphical element or symbol. In this case, the button sheet 102 is a flat sheet, but in other embodiments, the button sheet may be formed as a contoured or curved surface.

The button sheet 102 may enhance the mechanical strength of control button 112, which is used as an input to the device 100. In the present example, the control button 112 includes a tactile switch which is operated by depressing the control button 112. The control button 112 may also include or be associated with an electronic touch sensor, such as a capacitive touch sensor or biometric sensor. The button sheet 102, may be attached directly to a housing of the control button 112 and may, alternatively be attached or integrated with the electronic touch sensor of the control button 112.

In certain embodiments, the button sheet 102 depicted in FIG. 1A is formed from a sapphire part having an overall thickness of less than 3 mm and typically approximately 1 mm. Similar to the cover sheet 101, the button sheet 102 may be formed from a single sheet of sapphire material or, alternatively, be formed from a laminate material having at least one layer formed from a sheet of sapphire. In some cases, the button sheet 102 is formed from the same material as the cover sheet 102, although this is not necessary. One or both sides of the button sheet 102 may also be printed or coated to enhance the optical properties of the sapphire part.

As shown in FIG. 1B, the back surface of the device 100 is protected by a back sheet 103. Similar to the cover sheet 101, the back sheet 103 is also formed from a sapphire part and is used as an optically transmissive protective layer. In this case, the back sheet 103 provides visibility of graphical elements printed on the back face of the device 100. Also similar to the cover sheet 101, the back sheet 103 may be formed from a single sheet of sapphire material or, alternatively, be formed from a laminate material having at least one layer formed from a sheet of sapphire. In this case, the back sheet 103 covers the entire back of the device 100, except for the area near the camera lens 114. A separate sapphire part may be used to protect the camera lens 114. In an alternative embodiment, the back sheet 103 also covers the camera lens 114 and a separate sapphire part is not used.

In this example, the protective cover sheets (101, 102, 103) are formed from sapphire sheet parts made from a crystalline form of alumina ($Al_2O_3$), also referred to as corundum. The sapphire sheet may range in thickness from 3 mm to 0.1 mm and may have a hardness of approximately 9.0 on the Mohs scale, although alternative embodiments may have sheet(s) of different thickness(es). As discussed above, any one of the protective cover sheets (101, 102, 103) may be formed as a laminate of multiple sheets of material and may also be coated with one or more materials to enhance the optical or mechanical properties of the part. In some cases, it may be beneficial to form all of the protective cover sheets (101, 102, 103) from the same sapphire substrate to simplify the manufacturing process. However, different types of sapphire substrates may be used for each cover sheet, depending on the optical and/or mechanical properties desired for each piece.

As shown in FIGS. 1A-B, the device 100 is a portable electronic device. The device 100 may be any one of a variety of devices utilizing a hard substrate as a covering, window, and/or surface. For example, the device 100 may be a portable electronic device, such as a mobile phone, portable media player, or other handheld appliance. Similar types of protective covers may be applied to other electronic devices, including, for example, tablet computers, notebook computers, and wearable devices. Additionally, the protective covers may be applied to other types of devices including non-electronic devices, such as mechanical watches which utilize an optically transmissive face over the dial. Alternatively, the protective covers may be integrated with any device that includes a hard exterior surface, particularly if the surface includes a display screen, camera, or other optical element.

2. Method for Manufacturing a Sapphire Part

Consistent or prolonged heavy use of a device having one or more sapphire protective cover sheets, as depicted in FIGS. 1A-B, may result in damage to the surface. Even in the absence of environmental damage to the protective cover sheets, if the cover sheets are manufactured with flaws or micro cracks, those flaws or cracks may propagate through the part over time resulting in premature mechanical failure. Therefore, it is generally beneficial to manufacture a sapphire part used as a cover sheet in a way that minimizes flaws or micro cracks in the edge or surface of the part. The manufacturing system and method described below may be used to produce a sapphire part having a level of quality and reliability sufficient to function as a protective cover on a device.

Figure 2:
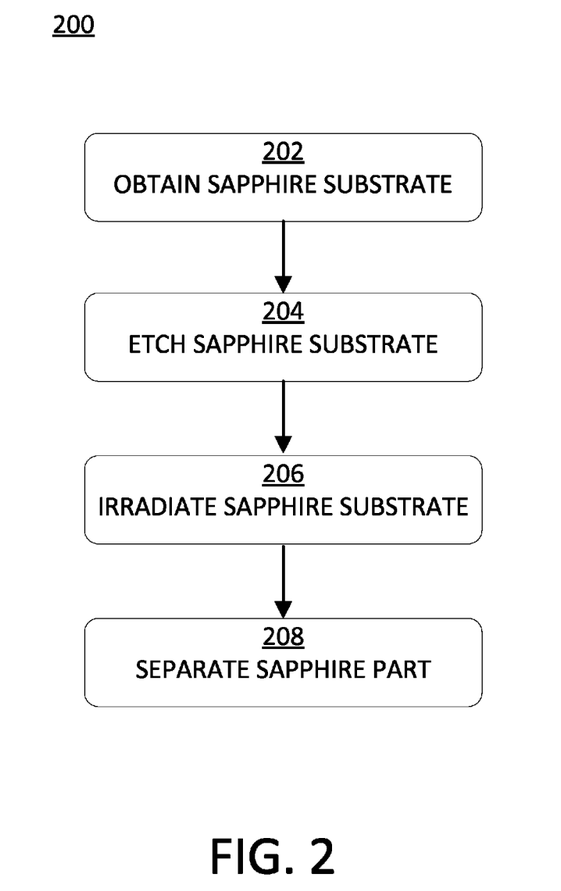
FIG. 2 depicts an example process for manufacturing a sapphire part.

FIG. 2 depicts an exemplary process 200 that can be used to manufacture a sapphire part. The exemplary process 200 may be implemented on, for example, the system 400 described below with respect the FIG. 4. Also, the sapphire part that is produced may be used as a protective cover sheet on a device in accordance with the examples provided above with respect to FIGS. 1A-B. The process 200 can also be used to produce a sapphire part used in a variety of other applications, including structural laminates, optical plates, optical lenses, and the like.

Figure 3A:
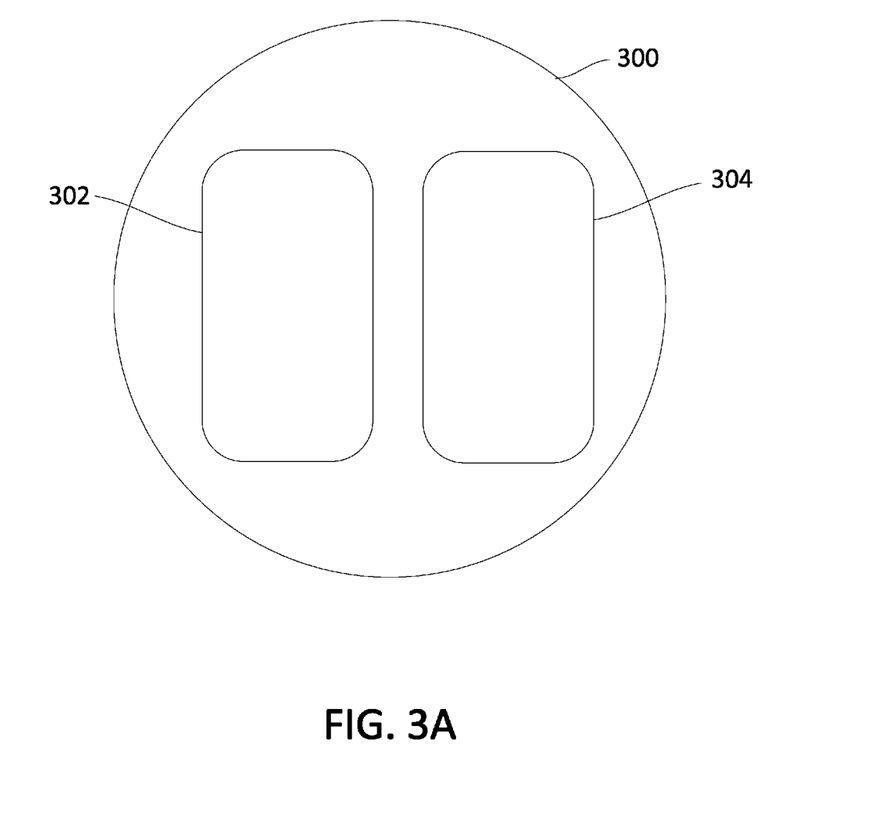
FIG. 3A depicts a sapphire substrate that has been cut.

In operation 202, a sapphire substrate is obtained. In the present example, the sapphire substrate is a sheet of synthetic sapphire approximately 1 mm thick, cut from a cylindrical boule of sapphire material. With reference to FIG. 3A, a sapphire substrate 300 may be formed as a flat disk-shaped sheet. Typically, the sapphire substrate 300 includes a sheet of sapphire material less than 3 mm thick and is obtained from a variety of sources, natural and synthetic. In some cases, the sapphire substrate 300 is a laminate composite having multiple layers and at least one layer made from a sapphire material. Other layers in the sapphire substrate laminate may include, for example, silicate glass, polymer sheet, or additional layers of sapphire material. The sapphire substrate may also include one or more coatings to improve the optical or mechanical properties of the substrate. Although the sapphire substrate of the present example is flat, in alternative embodiments, the sapphire substrate may have a contoured or other non-planar shape.

In operation 204, the sapphire substrate is cut. In this example, the sapphire substrate is cut using a laser fusion process with gas assist. In a typical laser fusion process, a laser beam is used to irradiate a portion of the surface of the substrate. The laser beam heats and melts the portion of the sapphire substrate at and near the point at which the laser beam is incident on the surface. In the present example, the sapphire substrate is cut using an infrared laser having a maximum power of 1,500 watts, a wavelength of 1070 nm, and a pulse width ranging from 0.2 to 10 ms. In one example cutting operation, a laser power of at least 950 watts is used. Typically, a laser having a beam width of 10 μm or less is used to cut the surface of the sapphire substrate. These parameters are provided by way of example. The laser power, laser wavelength, pulse width, and beam width may all vary within an acceptable range of values and may depend on, in part, the thickness of the sapphire substrate, the speed, and the quality of the cut that is desired.

Further, in operation 204, a stream of gas is used to remove the melted portion creating a cut portion on the surface of the sapphire substrate. In particular, the stream of gas is directed at the melted portion of the substrate and is used to blow the melted material off of the sapphire substrate. In this example, the stream of gas is substantially comprised of an inert gas media. In some cases, the inert gas comprises at least 100% by volume of the gas media used to cut the sapphire substrate. In some cases, the inert gas comprises at least 99.99% by volume of the gas media used to cut the sapphire substrate. In some cases, the inert gas comprises a minimum of 98% by volume of the gas media used to cut the sapphire substrate. In the present example, a gas medium comprised of 99% nitrogen gas by volume is used. Other acceptable inert gasses include helium, neon, argon, and other gasses that are not prone to chemical reaction with the sapphire substrate under laser cutting conditions.

The depth of the cut created in operation 204 depends, in part, on the power of the laser beam, the movement (e.g., feed rate) of the laser beam, and the properties of the stream of gas medium used to remove the material. In some cases, the cutting process results in a small depression or void in the surface of the sapphire substrate. In other cases, the cutting process results in a cut completely through the sapphire substrate.

In operation 204, the sapphire substrate is cut along a cut profile having a geometric shape that roughly corresponds to the desired shape of the sapphire part. With reference to FIG. 3A, a sapphire substrate 300 is cut with a laser and an inert gas medium along a cut profile 302, which roughly corresponds to the profile shape of the cover sheet 101 (depicted in FIG. 1A). Because a single sapphire substrate 300 may be large enough to create multiple sapphire parts, more than one cut profile may be created. As shown in FIG. 3A, another cut profile 304 is created in the sapphire substrate 300 in accordance with operation 204.

Figure 4:
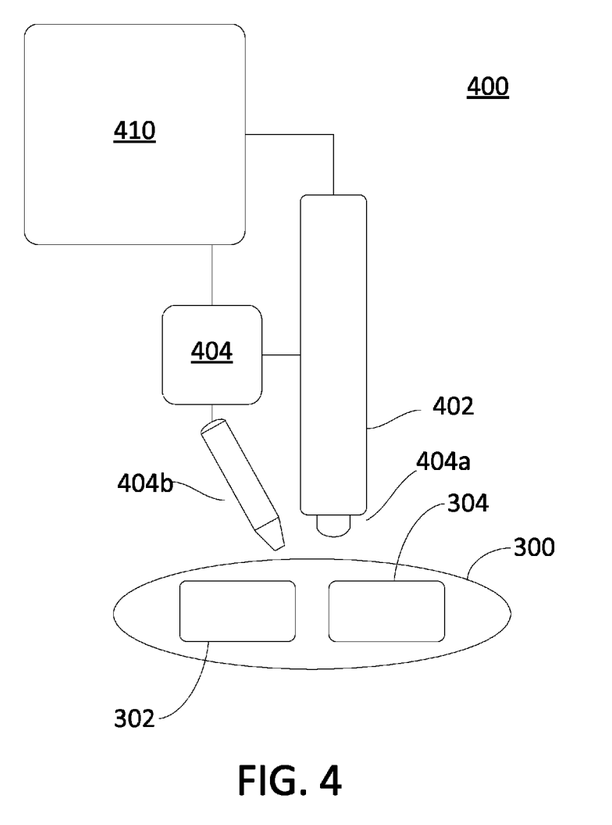
FIG. 4 depicts a schematic view of an exemplary system for producing a sapphire part.

In operation 204, the cut profile may be created by, for example, moving the laser beam with respect to the surface of the sapphire substrate. In some cases, the laser and the sapphire substrate are fixed and the cut profile is created by manipulating optical elements, such as mirrors, to direct the path of the laser beam. FIG. 4, discussed in more detail below, provides a schematic of an exemplary system that can be used to irradiate a sapphire substrate along a cut profile.

In general, a fusion laser cut using an inert gas, in accordance with operation 204, may result in a cut or depression with an acceptably low amount of defects or micro cracks. In some cases, a fusion laser cut results in a cut or depression that is substantially free of defects or micro cracks. Thus, operation 204 can be used to create a sapphire part with an acceptable edge quality. However, in some cases, using an inert gas medium for a fusion laser cut results in a discoloring of the sapphire substrate at or near the cut profile. In some cases, a darkened region or brown tint is created near the cut profile.

Depending on the application, it may be undesirable to have a darkened region on the final part. For example, if the sapphire part is to be used on a white colored device, the darkened region may be visually undesirable and difficult to hide using a printed border or other graphical element. Thus, in accordance with process 200, the sapphire substrate is irradiated a second time using a different gas medium to remove the darkened region.

In operation 206, the sapphire substrate is irradiated with the laser and a second, different gas medium. Similar to the previous cutting operation, the laser beam heats and melts the portion of the sapphire substrate at and near the point at which the laser beam is incident on the surface. However, in this example, the power of the laser is lowered to reduce the amount of material that is melted at the point of irradiation. In the present example, the sapphire substrate is cut using an infrared laser having a wavelength of 1070 nm, and a pulse width ranging from 0.2 to 10 ms. Typically, a laser having a beam width of 10 µm or less is used to cut the surface of the sapphire substrate. These parameters are provided by way of example, and the laser wavelength, pulse width, and beam width may all vary within a range of values and may depend, in part, on the speed of the irradiation and the degree of irradiation that is desired.

Typically, the laser power for the irradiation operation 206 is approximately 600 watts lower than laser power used for the cutting operation 204. In some cases, the laser power for operation 206 is as much as approximately 750 watts lower than the laser power used for the cutting operation 204. In some cases, the laser power for the irradiation operation 206 is approximately 500 watts lower than laser power used for the cutting operation 204.

Because the maximum power used for the cutting operation 204 may vary, it may be more useful to express the laser power used for the irradiation operation 206 in terms of a percentage of the maximum power. For example, in some cases, the laser power for the irradiation operation 206 is approximately 20% of the laser power used for the cutting operation 204. In some cases, the laser power for the irradiation operation 206 is approximately 35% of the laser power used for the cutting operation 204. In some cases, the laser power for the irradiation operation 206 is approximately 50% of the laser power used for the cutting operation 204. In some cases, the laser power for operation 206 may be the same as or greater than for the cutting operation 204. In some cases, other parameters, such as a pulse width of the laser, may be reduced for the irradiation operation 206.

In operation 206, a stream of gas is used to immerse the irradiated portion of the sapphire substrate. In this example, a second gas medium comprising approximately 21% of oxygen by volume is used during operation 206. Typically, the second gas medium comprises at least 15% but no more than 25% of oxygen by volume. During the irradiation operation 206, the oxygen in the second gas medium promotes an oxidation reaction on the surface of the sapphire substrate. Typically, the oxidation reaction removes the darkened region that may have been created during the previous operation 204. In some cases, the material that created the discolored region is burnt away by the oxidation process improving the visual appearance of the sapphire part. The oxidation may produce a white or hazy residue at the irradiation location. However, in some applications, the white or hazy residue is preferable to the darkened region as it can be more easily masked or hidden by a printed border or other graphical element.

Figure 3B:
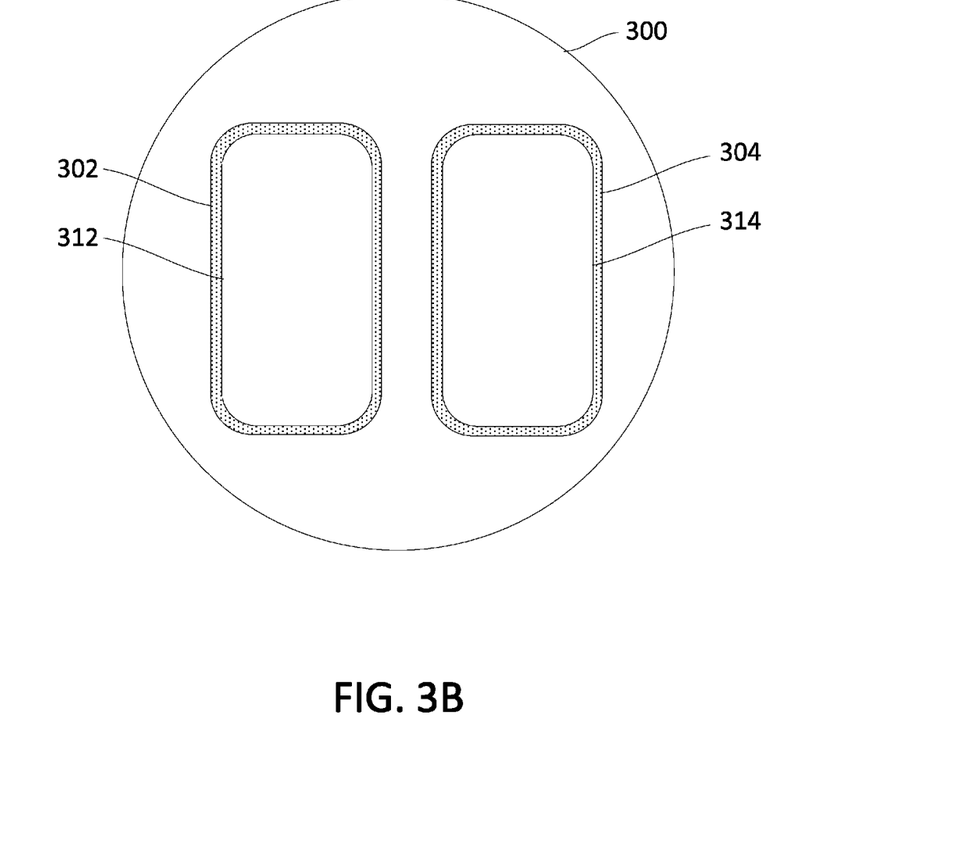
FIG. 3B depicts a sapphire substrate that has been cut and irradiated.

In operation 206, the sapphire substrate is irradiated along a profile path that is near or roughly corresponds to the cut profile path of the previous operation 204. In some cases, the profile path is substantially the same as the cut profile path created in operation 204. In other cases, the profile path of operation 206 is offset from the cut profile path. With reference to FIG. 3B, the profile path 312 is offset from the cut profile 302 and another profile path 314 is offset from the other cut profile 304. By offsetting the profile path, the irradiation and oxidation process of operation 206 can be more directly applied to the darkened region on the sapphire part.

In operation 208, the sapphire part is removed from the sapphire substrate. In the present example, a final fusion cut is performed on the sapphire substrate to completely remove material between the substrate and the sapphire part. Typically, the power of the laser is at approximately 1300 watts and another fusion cut is performed using an inert gas media similar to the first gas media used for cutting operation 204. In some cases, the second fusion cut is slightly offset from the first cut profile performed in operation 204. While, in some case, operation 208 involves an additional fusion cut, in other cases, the sapphire part may be completely or nearly completely separated by the cutting operation 204. In such a case, the sapphire part has already been physically separated from the substrate and only needs to be removed from the substrate. If the sapphire part has been separated from the substrate by cutting operation 204, the second fusion cut may remove additional material from the perimeter of the sapphire part.

Figure 3C:
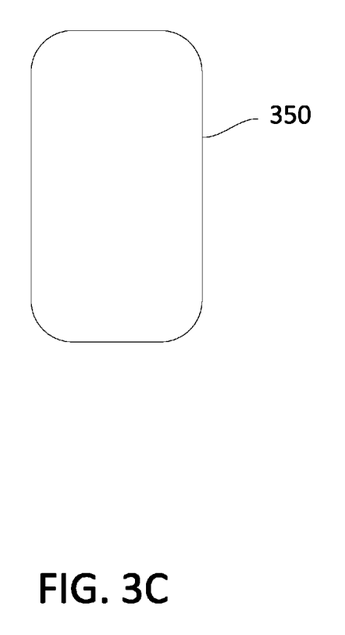
FIG. 3C depicts a sapphire part removed from the sapphire substrate.

FIG. 3C depicts an exemplary sapphire part 350 that may be produced using process 200. In this example, the sapphire part 350 corresponds to the cover sheet 101 (depicted in FIG. 1A). Additional processing and laser cutting may be performed on the sapphire part 350 before it is installed as the cover sheet on a device. For example, another laser cut in accordance with process 200 may also be performed on the sapphire part 350 at the location of the control button. Thus, the operations of process 200 may be performed multiple times on a substrate part to create the final product.

The order of operations of process 200 may also be different than as described with respect to the flow chart on FIG. 2. For example, in some cases, the irradiation process 206 may be performed after the sapphire part has been removed from the substrate in operation 208. That is, the sapphire part may be fusion cut completely from the substrate before the oxidation process of operation 206 is performed to remove any darkened regions.

3. System for Manufacturing a Sapphire Part

FIG. 4 depicts a schematic representation of a system that can be used to manufacture a sapphire part. In particular, the system 400 depicted in FIG. 4 can be used to create a sapphire part in accordance with process 200, described above with respect to FIG. 2. As described above with respect to FIGS. 1A-B, a sapphire part can be used as a protective cover for a portable electronic device, such as a mobile telephone.

As shown in FIG. 4, system 400 includes a laser 402 and a gas delivery device 404 comprising a coaxial gas delivery nozzle 404a and a side gas delivery nozzle 404b. The system 400 also includes a controller 410 used to control the laser 402, the gas delivery device 404. The system 400 also typically includes a support structure or positioning mechanism for holding and positioning a sapphire substrate 300 below the laser 402. Although the system depicted in FIG. 4 shows the laser 402 positioned above the sapphire substrate 300, the orientation of the laser 402 with respect to the sapphire substrate 300 may vary depending on the implementation.

In the present example, the laser 402 is a fiber laser configured to produce a laser beam at wavelengths centered at approximately 1070 nm and pulse durations ranging from 0.2 to 10 ms. Because the sapphire substrate 300 may absorb emissions near 1070 nm, the laser 402 is configured to heat and cut the sapphire substrate 300. Typically, the laser 402 can be configured to produce a laser beam at a power ranging from 10 watts to 150 watts average power (with a maximum of 1,500 watts of maximum power).

The system 400 also includes a mechanism for directing the laser beam produced by the laser 402 onto the surface of the sapphire substrate 300. The mechanism may position the laser 402, position the sapphire substrate 300, manipulate the path of the laser beam, or any combination of the three. In general, mechanism is able to direct the laser beam along one or more cut paths (302, 304) on the surface of the sapphire substrate 300. For example, the sapphire substrate 300 may be mounted on a two-dimensional servo-controlled stage that is configured to position the sapphire substrate 300 at different locations within a geometric plane. Also, servo-controlled optical elements, such as mirrors, may be configured to direct the laser beam at different locations on the surface of the sapphire substrate 300.

As shown in FIG. 4, the system 400 also includes a gas delivery device 404 having a coaxial gas delivery nozzle 404a and a side gas delivery nozzle 404b for directing a stream or streams of a gas medium onto the surface of the sapphire substrate 300. Typically, the gas delivery device 404 is configured to direct a stream of gas at or near the location where the laser beam is incident on the surface of the sapphire substrate 300. Thus, the laser beam and the surface of the sapphire substrate 300 near the incident laser beam are immersed in the gas media provided by the gas delivery device 404. The gas delivery device 404 is generally configurable to provide a range of flow velocities and mass flow rates to facilitate etching, cutting, and irradiating operations in accordance with process 200, described above. Specifically, the coaxial gas delivery nozzle 404a is configured to produce a stream of gas media at a pressure with a range from 5 bar to 15 bar using a nozzle having a diameter ranging from 0.1 mm to 0.5 mm. In one example, the gas delivery device 404 is configured to produce a coaxial gas stream at a pressure of 8 bar using the coaxial gas delivery nozzle 404a having a diameter of 0.3 mm.

The gas delivery device 404 is also configured to deliver a stream of multiple types of gas media. In particular, the gas delivery device 404 is configured to deliver a gas medium having a first composition comprising an inert gas, in accordance with operation 204, described above with respect to FIG. 2. The gas delivery device 404 is also configured to deliver a second, different gas medium comprising an oxygen gas, in accordance with operation 204, described above with respect to FIG. 2. The gas delivery device 404 may also be configured to deliver other gas media having different compositions than as described above.

As shown in FIG. 4. The gas delivery device 404 may be configured to deliver the stream of gas at substantially the same angle, or substantially coaxially with, the laser beam that is incident on the substrate. Specifically, the gas delivery device 404 may use the coaxial gas delivery nozzle 404a to produce a stream of gas that is substantially coaxial with the laser beam. Alternatively or additionally, the gas delivery device 404 may be configured to deliver a stream of gas at an angle with respect to the laser beam that is incident on the substrate using gas delivery nozzle 404b. The coaxial gas delivery nozzle 404a and the side gas delivery nozzle 404b may be used in tandem or, alternatively, may be used separately. That is, in some cases, the coaxial gas delivery nozzle 404a provides all or substantially all of the gas media used for laser cutting and irradiating operations.

As shown in FIG. 4, the system 400 also includes controller 410. In the present embodiment, the controller includes a computer processor (e.g., a microcontroller) and computer memory for storing computer-readable instructions. The computer-readable instructions may be executed on the computer processor causing the system 400 to perform the process 200, described above with respect to FIG. 2. The controller 410 also includes an input/output (I/O) for communicating with other elements of the system 400, including the laser 402 and the gas delivery device 404.

Operation of the system 400 may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

We claim:

1. A method of manufacturing a sapphire part comprising:
   cutting the sapphire substrate along a cut profile using a laser and a first gas medium that is substantially comprised of an inert gas, wherein the cutting produces a darkened tint on the sapphire substrate near the cut profile; and
   irradiating the sapphire substrate near the cut profile using the laser and a second gas medium that is different than the first gas medium and comprises at least 15% oxygen by volume to reduce a darkness of the darkened tint by oxidizing the darkened tint.

2. The method of manufacturing the sapphire part of claim 1, further comprising:
   separating the sapphire part from the sapphire substrate;
   performing a final cut on the sapphire substrate using the laser resulting in the separation of the sapphire part from the sapphire substrate, wherein the final cut is performed after the sapphire substrate has been irradiated using the second gas medium.

3. The method of manufacturing the sapphire part of claim 1, further comprising:
   performing a final cut on the sapphire substrate using the laser resulting in a separation of the sapphire part from the sapphire substrate, wherein the final cut is performed before the sapphire substrate has been irradiated using the second gas medium.

4. The method of manufacturing the sapphire part of claim 1, wherein the irradiating using the second gas medium is performed at an irradiation laser power that is less than a cutting laser power used for cutting the sapphire substrate using the first gas medium.

5. The method of manufacturing the sapphire part of claim 4, wherein the cutting laser power is less than 950 watts and the irradiating laser power is at least 500 watts less than the cutting laser power.

6. The method of manufacturing the sapphire part of claim 1, wherein a final cut is performed using a final-cut laser power that is greater than a cutting laser power used for cutting the sapphire substrate using the first gas medium.

7. The method of manufacturing the sapphire part of claim 1, wherein the inert gas is nitrogen gas.

8. The method of manufacturing the sapphire part of claim 1,
   wherein cutting the sapphire substrate along the cut profile comprises:
   melting a portion of the sapphire substrate along the cut profile using the laser; and
   removing the portion of the sapphire substrate along the cut profile by blowing a stream of the first gas medium on the portion of the sapphire substrate that has been melted.

9. The method of manufacturing the sapphire part of claim 1,
   wherein irradiating the sapphire substrate along the cut profile comprises:
   heating a portion of the sapphire substrate along the cut profile using the laser; and
   immersing the portion of the sapphire substrate being heated in the second gas medium.

10. The method of manufacturing the sapphire part of claim 1, wherein the sapphire substrate comprises a laminate structure having multiple layers and at least one layer made from sapphire.

11. The method of manufacturing the sapphire part of claim 1, wherein the first gas medium comprises at least 99% inert gas by volume.

12. A method of manufacturing a sapphire part comprising:
    irradiating the sapphire substrate along a first cut profile using a laser and an inert gas to produce a molten sapphire and a darkened region along the first cut profile;
    removing the molten sapphire along the first cut profile using the inert gas;
    irradiating the sapphire substrate along a second cut profile using the laser and a second gas media, wherein:
    the second gas media is different than the first gas media,
    the second gas media comprises at least 15% oxygen by volume,
    the second cut profile is offset from the first cut profile, and
    the second gas media promotes an oxidation reaction at the second cut profile, the oxidation reaction to reduce a darkness of the darkened region the first cut profile; and
    separating the sapphire part from the sapphire substrate.

13. The method of manufacturing the sapphire part of claim 12, further comprising:
    performing a final cut on the sapphire substrate using the laser resulting in the separation of the sapphire part from the sapphire substrate, wherein the final cut is performed after the sapphire substrate has been irradiated along the second cut profile.

14. The method of manufacturing the sapphire part of claim 12, further comprising:
    performing a final cut on the sapphire substrate using the laser resulting in the separation of the sapphire part from the sapphire substrate, wherein the final cut is performed before the sapphire substrate has been irradiated along the second cut profile.

15. The method of manufacturing the sapphire part of claim 12,
    wherein the irradiation along the first cut profile is done at a first laser power that is greater than the irradiation along the second cut profile done at a second laser power.

16. The method of manufacturing the sapphire part of claim 12,
    wherein irradiating the sapphire substrate along the first cut profile comprises:

melting a portion of the sapphire substrate along the first cut profile using the laser; and removing the portion of the sapphire substrate by blowing a stream of the first gas medium on the portion of the sapphire substrate that has been melted.

17. The method of manufacturing the sapphire part of claim 12, wherein irradiating the sapphire substrate along the second cut profile comprises:

heating a portion of the sapphire substrate along the second cut profile using the laser; and immersing the portion of the sapphire substrate that has been heated in the second gas medium.

18. A method of manufacturing a portable electronic device comprising:

obtaining a sapphire part, the sapphire part formed by:
obtaining a sapphire substrate;
irradiating the sapphire substrate along a cut profile using a laser and a first gas media that is substantially comprised of an inert gas, wherein a tinted region along the cut profile is created; and
irradiating the sapphire substrate along the cut profile using the laser and a second gas media, wherein:
the second gas media is different than the first gas media and comprises at least 15% oxygen by volume;
the second gas media promotes an oxidization reaction within the tinted region to lighten a color of the tinted region
separating the sapphire part from the sapphire substrate; and attaching the sapphire part to an external face of the portable electronic device.

19. The method of manufacturing the portable electronic device of claim 18, wherein the portable electronic device is any one of: a mobile telephone, a portable media player, a wearable device, or a tablet computing device.

20. The method of manufacturing the portable electronic device of claim 18, wherein the first gas medium comprises at least 99% inert gas by volume.

21. A system for producing a sapphire part, the system comprising:

a gas delivery device, wherein the gas delivery device is configured to provide a stream of gas to a portion of a sapphire substrate that is irradiated by a laser beam; and a laser configured to produce the laser beam incident on the portion of the sapphire substrate, wherein the laser is further configured to:

irradiate the sapphire substrate along a cut profile while a first gas medium is provided by the gas delivery device that is substantially comprised of an inert gas, wherein a darkened region is produced along the cut profile; and irradiate the sapphire substrate along the cut profile while a second gas medium is provided by the gas delivery device that comprises at least 15% oxygen by volume and promotes an oxidation reaction along the cut profile to lighten a color of the darkened region.

22. The system of claim 21, wherein the laser is an infrared laser having a maximum power of 1,500 watts and a variable pulse duration ranging from 0.2 ms to 10 ms.

* * * * *